United States Patent [19]

Watson

[11] 4,249,425
[45] Feb. 10, 1981

[54] AUTOMATIC BELT TENSIONING MECHANISM

[75] Inventor: Richard D. Watson, Anderson, Ind.

[73] Assignee: General Motors Corporation, Detroit, Mich.

[21] Appl. No.: 89,229

[22] Filed: Oct. 29, 1979

[51] Int. Cl.³ .......................... F16H 7/10; F16H 7/12
[52] U.S. Cl. ............................. 474/110; 74/242.15 R
[58] Field of Search ............ 74/242.8, 242.9, 242.1 R, 74/242.1 A, 242.1 TA, 242.1 FP, 242.11 R, 242.11 C, 242.12, 242.15 R, 141.5, 127

[56] References Cited

U.S. PATENT DOCUMENTS

| | | | |
|---|---|---|---|
| 3,142,193 | 7/1964 | Polko et al. | 74/242.11 C |
| 3,442,147 | 5/1969 | Downey | 74/242.11 R |
| 3,785,220 | 1/1974 | Jacobs | 74/242.1 FP |
| 3,888,217 | 6/1975 | Hisserich | 74/242.15 R |

FOREIGN PATENT DOCUMENTS

| | | | |
|---|---|---|---|
| 2414046 | 10/1974 | Fed. Rep. of Germany | 74/242.15 R |
| 1725015 | 2/1976 | Fed. Rep. of Germany | 74/242.1 FP |
| 445294 | 2/1949 | Italy | 74/242.8 |
| 336699 | 4/1957 | Switzerland | 74/242.1 FP |

*Primary Examiner*—Lawrence J. Staab
*Attorney, Agent, or Firm*—Donald F. Scherer

[57] ABSTRACT

An automatic belt tensioner has a vacuum motor which is stroked by a variable vacuum source such as a gasoline engine intake to drive a one-way device which is operatively connected to rotate a nut in one direction. A nut is threadably engaged with a nonrotatable screw member and is connected to a pivotal support member. When the nut is rotated in one direction by the vacuum motor and the one-way device, the screw member is moved longitudinally to pivot the pulley support in a direction to increase belt tension. The reaction force between the nut and screw member which is proportional to belt tension is applied to a vacuum cut-off mechanism which disconnects the vacuum source from the vacuum motor so that a predetermined belt tension is maintained.

5 Claims, 11 Drawing Figures

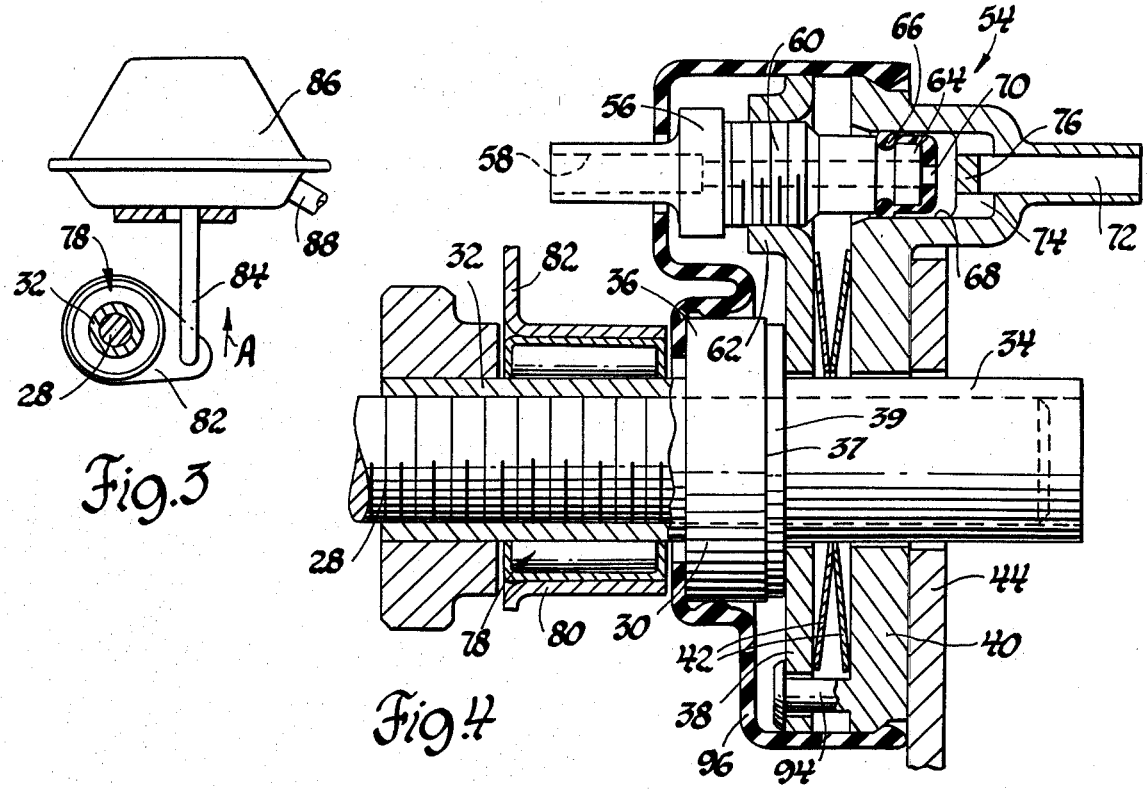
Fig.3
Fig.4
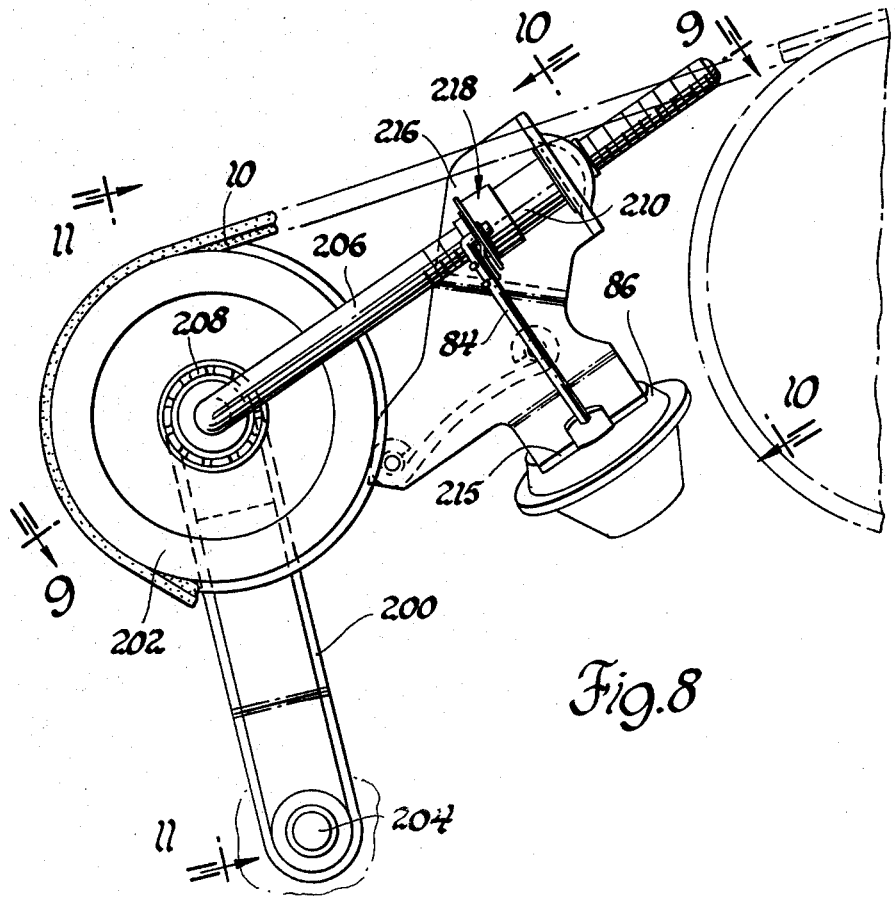
Fig.8

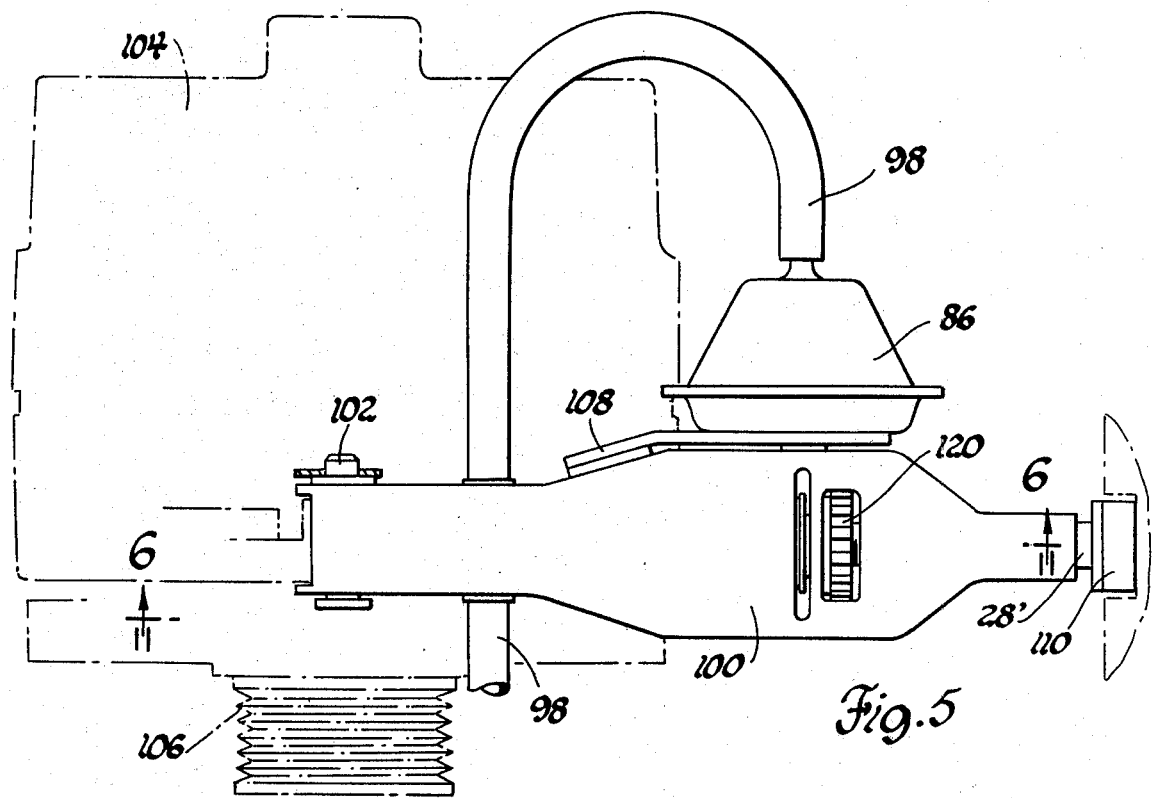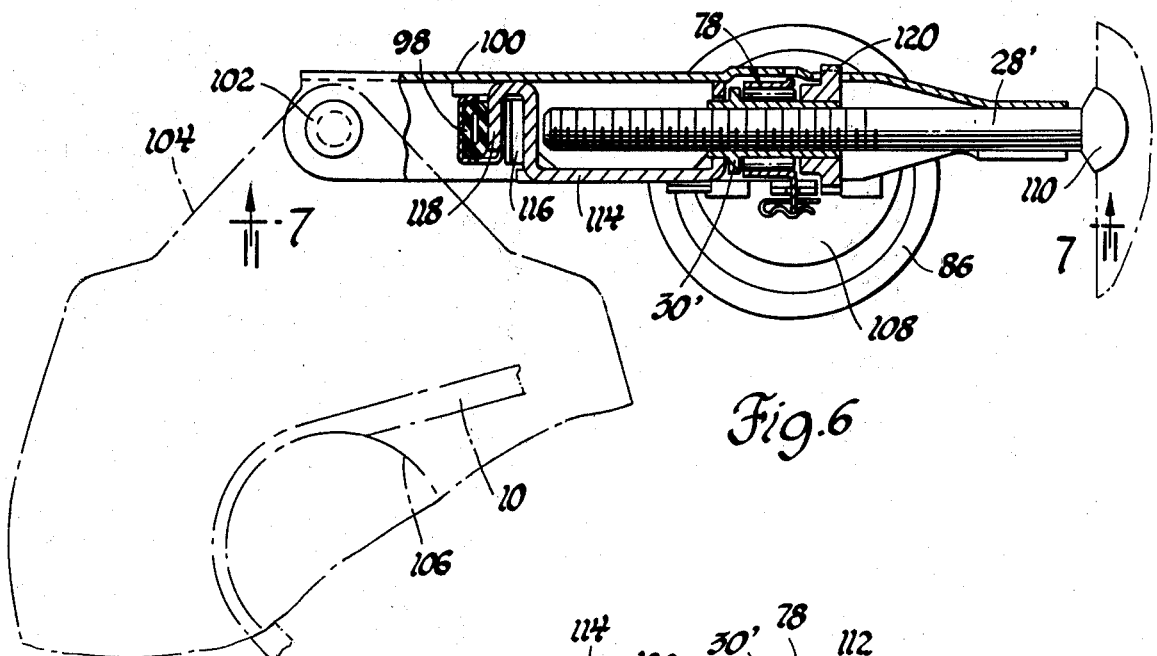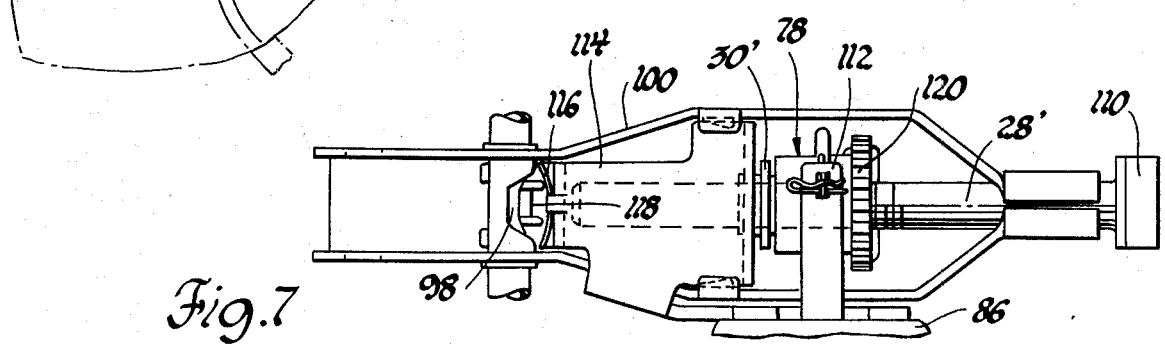

AUTOMATIC BELT TENSIONING MECHANISM

This invention relates to belt tensioning mechanisms and more particularly to vacuum-actuated automatic belt tensioning mechanisms.

It is an object of this invention to provide an improved belt tensioning mechanism which will automatically adjust the belt tension in response to a vacuum signal.

It is another object of this invention to provide an automatic belt tensioning system in which a nut and screw actuator are operated on by a vacuum motor through a one-way device to cause longitudinal extension of the screw member resulting in pivoting of a pulley support member which will create an increase in belt tension.

It is still another object of this invention to provide an automatic belt tensioning system in which a nut and screw actuator are operated on by a vacuum motor through a one-way device to cause longitudinal extension of the screw member resulting in pivoting of a pulley support member which will create an increase in belt tension and wherein the vacuum source is disconnected from the vacuum motor at a predetermined belt tension.

A further object of this invention is to provide an automatic belt tensioning mechanism wherein a nut and screw actuator are driven by a vacuum motor to a one-way device to adjust the tension in a belt and wherein the reaction force between the nut and screw of the actuator is operative on a mechanism which will discontinue the vacuum supply to the vacuum motor at a predetermined reaction force which is proportional to the desired belt tension.

These and other objects and advantages of the present invention will be more apparent from the following description and drawings in which:

FIG. 3 is a view taken along line 3—3 of FIG. 2;

FIG. 4 is an enlarged view of the vacuum valve mechanism used in FIGS. 1 and 2;

FIG. 5 is a top view of another embodiment of the present invention;

FIG. 6 is a view taken along line 6—6 of FIG. 5;

FIG. 7 is a view taken along line 7—7 of FIG. 6;

FIG. 8 is a view of a further embodiment of the present invention;

Figure 1:
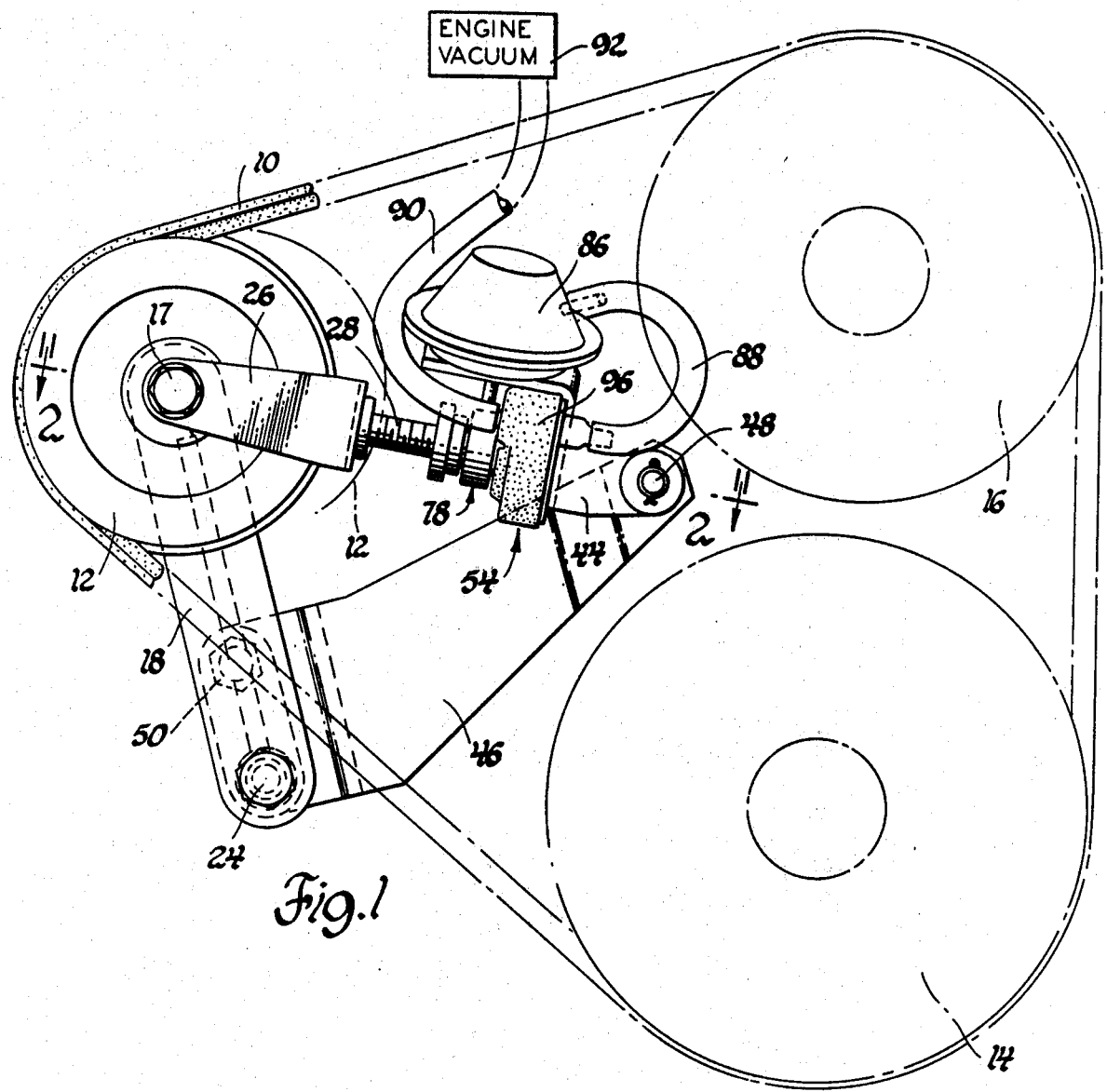
FIG. 1 is an elevational view of one embodiment of the present invention.

Referring to the drawings, wherein like characters represent the same or corresponding parts throughout the several views, there is seen in FIG. 1, a drive belt 10 which is trained about three pulleys 12, 14 and 16. Pulley 14 is preferably secured to an engine crank shaft and pulley 16 is connected to drive an engine accessory device such as a generator or power steering pump or the like. Pulley 12 is an idler pulley or a belt tensioning pulley which is adjustable in position so that the belt 10 may have the desired tension.

The pulley 12 is rotatably mounted on fastener 17 secured to a pivotal bracket 18 through two sleeves 20 and a bearing 22. The bracket 18 is connected to the engine block by a fastener 24 about which the bracket 18 pivots. The fastener 17 and sleeves 20 are positioned by a pair of spacers 21 relative to a yoke 26 which has attached thereto a screw member 28. The screw member 28 is connected to the yoke in a nonrotatable manner and has threadably connected thereto a nut 30 having threaded cylindrical extensions 32 and 34 and an enlarged outer diameter central section 36. The axial face 37 of central section 36 abuts a thrust washer 39 which positions a plate 38 which is held separated from a reaction plate 40 by a pair of Belleville or washer springs 42. The reaction plate 40 abuts a stationary yoke member 44 which is pivotally supported on a stationary bracket 46 by a pin 48. The bracket 46 is secured to the engine block by a fastener 50 and also by a tube member 52 and fastener 24. The thrust washer 39 permits relative rotation between face 37 and plate 38 which remains nonrotative with plate 40.

The reaction plate 40 and plate 38 are also components in a valve mechanism generally designated 54 and includes a threaded member 56 which has a central passage 58 and an externally threaded portion 60 which threadably engages a boss 62 formed on plate 38. Threaded member 56 has an extension 64 surrounded by a cap 66 made of elastomeric material, which is slidably disposed in a passage 68 formed integrally with the reaction plate 40. The flexible cap 66 has a passage 70 which axially aligns with the passage 58. The passage 68 is connected to a passage 72 through a plurality of passages 74, which surround a blocking member 76. The blocking member 76 is axially aligned with the passage 70 such that, as will be explained later, when the threaded member 56 moves to the right, the passage 70 will be closed by the blocking member 76.

The cylindrical extension 32 has mounted thereon a one-way device 78. This device 78 is preferably of the well-known roller clutch type, however, many of the other well-known one-way devices can be used to provide the desired operation.

The one-way device 78 has an outer member 80 which has integrally formed therewith an arm 82 which is drivingly connected to a rod 84 which is the output member for a conventional vacuum motor 86. The vacuum motor 86 is connected via a passage 88 to the passage 72 of valve 54, and, as seen in FIG. 1, the passage 58 of valve 54 is connected through a passage 90 to a vacuum source 92 which may, of course, be the intake manifold of a gasoline engine or any other suitable but preferably variable vacuum source.

As is well-known, a vacuum motor includes a diaphragm member and output rod which respond to vacuum on one side of the diaphragm to be moved in that direction and also has incorporated therein a spring member which moves the diaphragm and therefore the output rod in the opposite direction when the vacuum signal is below a predetermined value. In the present situation, as the vacuum motor is stroked due to the vacuum level, the rod 84 will be moved in the direction of Arrow A resulting in the pivoting of arm 82 and accordingly the rotation of one-way device 78. In this direction of rotation, the one-way device 78 is adapted to transmit drive forces to the nut 30 thereby causing rotation of the nut 30. Since the screw 28 is nonrotatable, longitudinal movement thereof results which causes pivoting of the bracket 18 and an increase in the tension of belt 10. The longitudinal reaction force between the nut 30 and the screw 28 is operable on the plate 40 through the springs 42 and plate 38. When the vacuum source approaches atmospheric pressure, the rod 84 will stroke in a direction opposite to Arrow A. However, such movement of the rod 84 will not be transmitted to the nut 30 since the one-way device will not transmit torque in that direction and the inherent friction in the mating thread prevents rotation of nut 30.

As the reaction force, resulting from belt tension, increases to a predetermined value, the nut 30 will have sufficient force imposed thereon to overcome the force in springs 42 resulting in movement of the plate 38 and therefore threaded member 60 toward the plate 40. When sufficient movement has occurred in this direction, as previously mentioned, the passage 70 will be closed by the blocking member 76. When the closing of passage 70 occurs, the vacuum source 92 is effectively disconnected from the vacuum motor 86 such that further stroking of the vacuum motor 86 is not permitted. However, if the belt 10 should stretch, this is a common occurrence, the springs 42 will force the separation of plates 38 and 40 thereby reopening the passage 70. When the passage 70 is reopened, the vacuum motor 86 is again connected to the vacuum source 92 such that the belt tension will be increased until the desired belt tension is achieved at which time the passage 70 will again close.

The leftward movement of plate 38 relative to plate 40 is limited by a plurality of fastening members 94 which are formed integrally with plate 40 and have an upset head thereon which abuts the surface of plate 38. The threaded member 60 can be adjusted relative to the plate 40 by rotation thereof which will result in longitudinal movement of the threaded member 56 relative to both plates 38 and 40. Thus, the valve mechanism has sufficient latitude to permit a wide range of operation and the range in which the valve will close is dependent upon the spring load in springs 42, the spring rate of springs 42 and the longitudinal position of threaded member 56 relative to the blocking member 76. It will be appreciated by those skilled in the art that the springs 42 provide a lost motion connection between the plates 38 and 40 which permit the relative movement between threaded member 56 and passage 68.

The valve member 54 has a resilient cover member 96 which reduces the possibility of atmospheric contaminents interfering with the operation of valve 54.

By using the automatic tension adjustment, only one pulley in the accessory drive train need be pivotally mounted. The remaining pulleys can operate at fixed center positions reducing the number of manually adjustable brackets.

Figure 2:
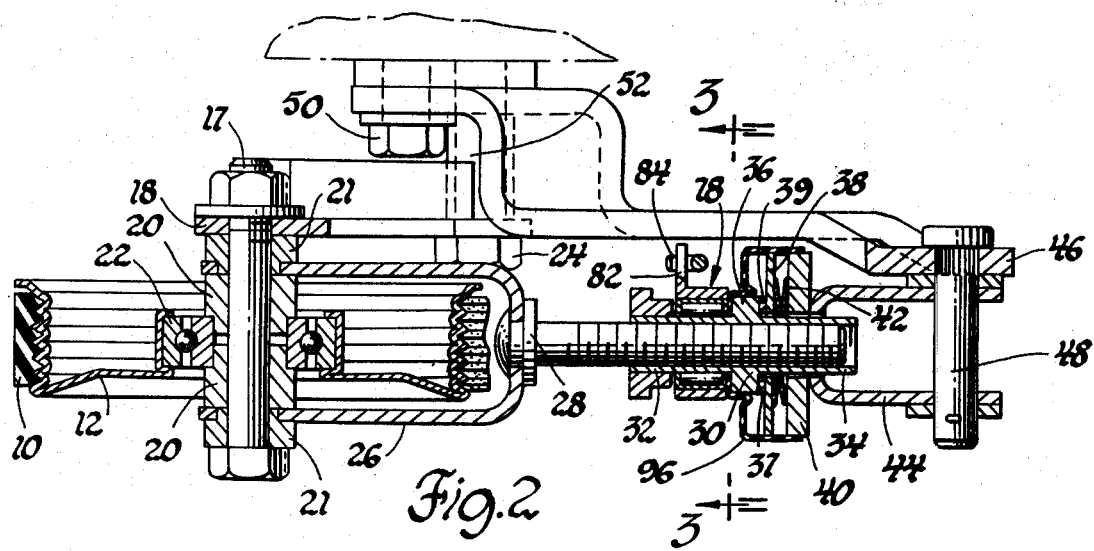
FIG. 2 is a view taken along line 2—2 of FIG. 1.
Figure 9:
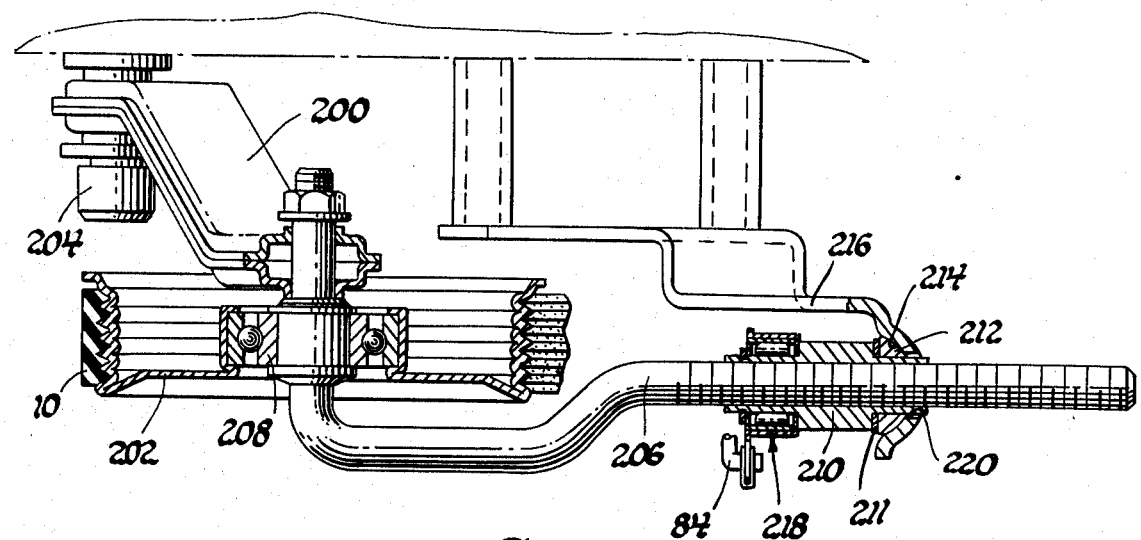
FIG. 9 is a view taken along line 9—9 of FIG. 8.
Figure 10:
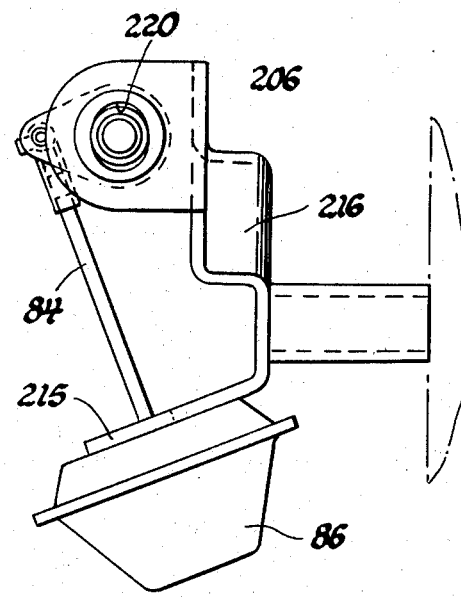
FIG. 10 is a view taken along line 10—10 of FIG. 8.
Figure 11:
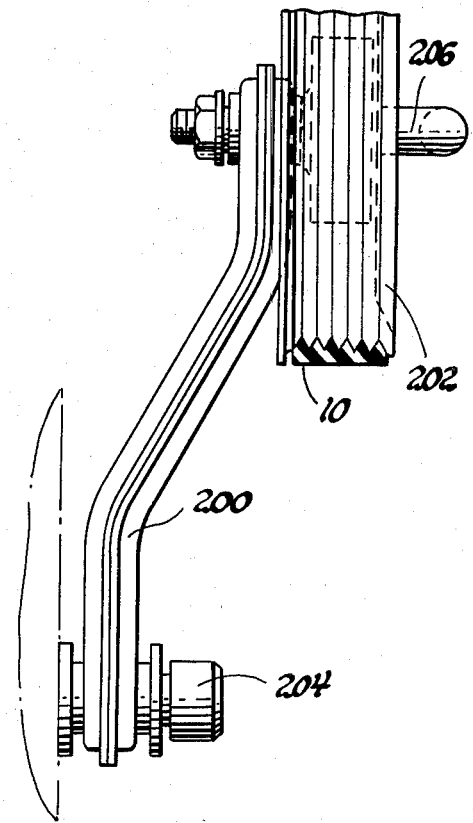
FIG. 11 is a view taken along line 11—11 of FIG. 8.

The embodiment shown in FIG. 5 is similar to that described above for FIGS. 1 through 3 but incorporates a substantially different vacuum disconnect mechanism. The tensioning mechanism shown in FIG. 5 includes a vacuum motor 86 which has connected thereto a flexible passage or hose 98. The passage 98 passes through a housing 100 and is connected to the vacuum source 92. The housing 100 is pivotally connected by a pin 102 to a conventional vehicle generator 104. The vehicle generator 104 is pivotally mounted on the engine in a well-known manner and has operatively connected thereto, a pulley 106 about which is trained the belt 10.

The housing 100 has supported thereon a bracket 108 to which is secured the vacuum motor 86. The housing 100 slidably encases a threaded member such as screw 28' which has an end 110 in operative relationship with a stationary component on the vehicle engine. The screw 28' is threadably engaged by a nut 30' which is driven through the one-way member 78 by an output arm 112 of vacuum motor 86. The nut 30' abuts an arm 114 which is engaged by a leaf spring 116 operatively connected to the housing 100. The arm 114 has an end portion 118 which abuts the passage 98 as it passes through and is supported by the housing 100.

As described above in the operation of FIG. 1, the nut 30' is rotated by the vacuum motor 86 and one-way device 78. In this embodiment, however, since the screw member 28' is fixed by a stationary member, the nut 30' and arm 114 move longitudinally relative to the screw 28'. Due to the connection between arm 114 and housing 100 by spring 116, the housing 100 also moves longitudinally resulting in pivoting of generator 104 and therefore an increase of tension in belt 10. The reaction force between screw 28' and nut 30' is transmitted by the spring member 116 such that when the reaction force reaches a predetermined level, the spring 116 will permit relative movement between the arm 114 and housing 100 resulting in closing of the passage 98 and thereby effectively disconnecting the vacuum source 92 from the vacuum motor 86. As noted above, if belt 10 stretches, the passage 98 will be reopened.

The mechanism shown is FIGS. 5 through 7 incorporates a manually operative thumb wheel 120 which, when desired, can be operated to reduce the tension in belt 10 if, for example, it is desired to remove an engine accessory or replace a worn belt. The thumb wheel 120 can also be used to place some initial tension in the belt 10 at the time of assembly.

The embodiment shown in FIGS. 8 through 11, can incorporate either of the valve mechanisms shown in FIGS. 1 through 7. If desired, the system can be designed such that the maximum force that can be transmitted to the belt is controlled such that overtensioning of the belt cannot occur and a disconnect valve mechanism would not be needed. This, however, would require a specific size motor and a specific helix or lead angle on the nut and screw actuator for each tension desired. It is therefore preferable to utilize a vacuum disconnect system to achieve the desired tension.

The embodiment shown in FIGS. 8 through 11 incorporates a bracket 200 on which is rotatably mounted a pulley 202 about which is trained a belt 10. The bracket 200 is pivotally supported on the engine block by a fastener 204. A threaded member 206 is secured to the bracket 200 and has mounted thereon a bearing 208 which rotatably supports the pulley 202.

A nut 210 threadably engages the screw 206 and operates, through a thrust washer 211, against a substantially semispherical abutment member 212 which is disposed in a semispherical pocket 214 formed in a bracket 216 which is secured to a stationary part of the engine block and provides a support portion 215 for the vacuum motor 86. The output rod 84 of vacuum motor 86 drives a one-way device 218 creating unidirectional rotation of nut 210 and longitudinal motion of screw 206. The semispherical pocket 214 has an elongated opening 220 through which the screw 206 extends. The elongated opening 220 permits the nonlinear or skewing motion of screw 206 to be accommodated. This nonlinear motion occurs to accommodate the pivoting of the bracket 200 and pulley 202 about the fastener 204. The semispherical abutment member 212 accommodates this nonlinear movement and maintains the required longitudinal alignment between nut 210 and screw 206.

It should be obvious that a valve mechanism similar to 54 can be incorporated between nut 210 and semispherical member 212. It should also be obvious to one skilled in the art, that a tube-pinching mechanism similar to that described above could be incorporated into the embodiment shown in FIGS. 8 through 11.

The embodiments shown in FIGS. 1 and 8 will permit the belt tension to be slackened by manual rotation of the nut 30 and nut 210, respectively. If a manual tensioning is desired, it is recommended that the rod 84 of vacuum motor 86 be removed prior to an increase in tension manually.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or pivilege is claimed are defined as follows:

1. An automatic belt tensioner comprising; a pivotal support means for supporting a pulley about which a belt is trained; fixed support means for providing a relatively stationary position; and an adjusting mechanism operatively connected between said pivotal support means and said fixed support means including a pair of threaded means which move longitudinally relative to the other in response to rotation of the one of the threaded means to vary the distance between the support means and thereby adjust belt tension, one-way drive means and vacuum motor operative to rotate the one of said threaded means, passage means operatively connected to said threaded means and interconnecting said vacuum motor to a variable vacuum source, and lost motion load reaction means operatively connected to said threaded means and being operable upon a predetermined longitudinal force being present in said threaded means proportional to a predetermined belt tension for effecting closing of said passage means to disconnect the vacuum source from said vacuum motor.

2. An automatic belt tensioner comprising; a pivotal support means for supporting a pulley about which a belt is trained; fixed support means for providing a relatively stationary position; and an adjusting mechanism operatively connected between said pivotal support means and said fixed support means including a pair of threaded means one of which moves longitudinally in response to rotation of the other to vary the distance between the support means and thereby adjust belt tension, one-way drive means and vacuum motor means operative to rotate the other of said threaded means and cooperating with said thread means to establish a predetermined tension in said belt, and a variable vacuum source operative to drive said vacuum motor.

3. An automatic belt tensioner comprising; a pivotal support means for supporting a pulley about which a belt is trained; fixed support means for providing a relatively stationary position; and an adjusting mechanism operatively connected between said pivotal support means and said fixed support means including a pair of threaded means one of which moves longitudinally in response to rotation of the other to vary the distance between the support means and thereby adjust belt tension, one-way drive means and vacuum motor means operative to rotate the other of said threaded means, passage means operatively connected to said other threaded means and interconnecting said vacuum motor to a variable vacuum source, and lost motion load reaction means operatively connected to said other threaded means and being operable upon a predetermined longitudinal force being present in said one threaded means proportional to a predetermined belt tension to permit longitudinal motion of said other threaded means for effecting closing of said passage means to disconnect said vacuum source from said vacuum motor.

4. An automatic belt tensioner comprising: a pivotal support means for supporting a pulley about which a belt is trained; fixed support means for providing a relatively stationary position; and an adjusting mechanism operatively connected between said pivotal support means and said fixed support means including a pair of threaded means one of which moves longitudinally in response to rotation of the other to vary the distance between the support means and thereby adjust belt tension, one-way drive means and vacuum motor means operative to rotate the other of said threaded means, passage means operatively connected to said other threaded means and interconnecting said vacuum motor to a variable vacuum source, and lost motion load reaction means operatively connected to said other threaded means and being operable upon a predetermined longitudinal force being present in said one threaded means proportional to a predetermined belt tension to permit longitudinal motion of said other threaded means and including valve means having a longitudinally movable member and a stationary member that are brought into abutment for effecting closing of said passage means to disconnect said vacuum source from said vacuum motor.

5. An automatic belt tensioner comprising; a pivotal support means for supporting a pulley about which a belt is trained; fixed support means for providing a relatively stationary position; and an adjusting mechanism operatively connected between said pivotal support means and said fixed support means including a pair of threaded means one of which moves longitudinally in response to rotation of the other to vary the distance between the support means and thereby adjust belt tension, one-way drive means and vacuum motor means operative to rotate the other of said threaded means, passage means operatively connected to said other threaded means and interconnecting said vacuum motor to a variable vacuum source, and lost motion load reaction means including spring means and a portion of said passage operatively connected to said other threaded means and being operable upon a predetermined longitudinal force being present in said one threaded means proportional to a predetermined belt tension to permit longitudinal motion of said other threaded means for closing of said portion of said passage means to disconnect said vacuum source from said vacuum motor.

* * * * *